(12) United States Patent
Chen et al.

(10) Patent No.: US 10,274,343 B2
(45) Date of Patent: Apr. 30, 2019

(54) ROTARY ENCODER WITH STAGGERED ENCODER WHEELS

(71) Applicant: AVISION INC., Hsinchu (TW)

(72) Inventors: Yen-Cheng Chen, Hsinchu County (TW); Jan-Hsing Kao, Miaoli County (TW)

(73) Assignee: Avision Inc. (TW)

( * ) Notice: Subject to any disclaimer, the term of this patent is extended or adjusted under 35 U.S.C. 154(b) by 85 days.

(21) Appl. No.: 15/482,319

(22) Filed: Apr. 7, 2017

(65) Prior Publication Data

US 2017/0336226 A1  Nov. 23, 2017

(30) Foreign Application Priority Data

May 18, 2016  (TW) .............................. 105115257 A

(51) Int. Cl.
*G01D 5/347* (2006.01)
(52) U.S. Cl.
CPC ....... *G01D 5/3473* (2013.01); *G01D 5/34707* (2013.01)
(58) Field of Classification Search
CPC ........... G01D 5/24438; G01D 5/34707; G01D 5/34738
See application file for complete search history.

(56) References Cited

U.S. PATENT DOCUMENTS

2002/0195551 A1* 12/2002 Baxter ................ G01D 5/3473
250/231.13
2016/0061292 A1   3/2016 Mizuhashi et al.

FOREIGN PATENT DOCUMENTS

JP    2016048098 A   4/2016
TW    M516714 U     2/2016

* cited by examiner

*Primary Examiner* — Thanh Luu

(57) ABSTRACT

A rotary encoder includes a rotating shaft, first and second encoder wheels, first and second detectors and a processor. The first encoder wheel includes coaxially disposed first and second portions. The first portion has first graduation features. The second portion has a first positioning structure. The second encoder wheel includes coaxially disposed third and fourth portions. The third portion has second graduation features. The fourth portion has a second positioning structure meshing with the first positioning structure, so that the first graduation features and the second graduation features are staggered, and the first encoder wheel and the second encoder wheel are coaxially mounted on the rotating shaft. The first and second detectors detect the first and second graduation features and output first and second signals, respectively. The processor calculates a rotating angle of the rotating shaft according to the first and second signals.

9 Claims, 7 Drawing Sheets

ROTARY ENCODER WITH STAGGERED ENCODER WHEELS

This application claims priority of No. 105115257 filed in Taiwan R.O.C. on May 18, 2016 under 35 USC 119, the entire content of which is hereby incorporated by reference.

BACKGROUND OF THE INVENTION

Field of the Invention

This disclosure relates to a rotary encoder, and more particularly to a rotary encoder with staggered encoder wheels.

Description of the Related Art

A rotary encoder is also known as a shaft encoder, which is an electromechanical device for converting an angular position or a rotation amount into an analog or digital signal, and is typically mounted on one surface of a rotary object perpendicular to a rotation axis of the rotary object. The rotary encoder is applied to many occasions, such as the industry control, robot technology, dedicated lens, computer input device (e.g. mouse or track ball) or the like, where the precise angular position and speed are needed.

There are multiple slots formed on a top surface of a conventional encoder wheel. If the measurement resolution of the rotating angle is to be increased, the slots must be arranged in a denser manner, which is disadvantageous to the mass production of the encoder wheels by way of plastic injection molding. For example, the demolding cannot be easily performed or the yield is low.

SUMMARY OF THE INVENTION

Thus, an object of this disclosure is to provide a rotary encoder having staggered encoder wheels to achieve the effect of increasing the resolution.

To achieve the above-identified object, this disclosure provides a rotary encoder comprising a rotating shaft, a first encoder wheel, a second encoder wheel, a first detector, a second detector and a processor. The first encoder wheel comprises coaxially disposed first portion and second portion. The first portion has first graduation features, and the second portion has a first positioning structure. The second encoder wheel comprises coaxially disposed third portion and fourth portion. The third portion has second graduation features. The fourth portion has a second positioning structure, and the first positioning structure meshes with the second positioning structure, so that the first graduation features and the second graduation features are staggered, and the first encoder wheel and the second encoder wheel are coaxially mounted on the rotating shaft. The first detector detects the first graduation features to output a first signal. The second detector detects the second graduation features to output a second signal. The processor is electrically connected to the first detector and the second detector, receives the first signal and the second signal, and calculates a rotating angle of the rotating shaft according to the first signal and the second signal.

With the above-mentioned rotary encoder, the staggered encoder wheels may be used to achieve the effect of increasing the resolution, so that the manufacturing cost of the encoder wheel can be decreased, and the production yield can be increased. Because the encoder wheels with the same structure can be adopted to achieve the staggered effect, only one set of molds needs to be used to manufacture the encoder wheels by way of injection molding, so that the manufacturing cost of the rotary encoder can be further decreased, and the assembling processes can be simplified.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
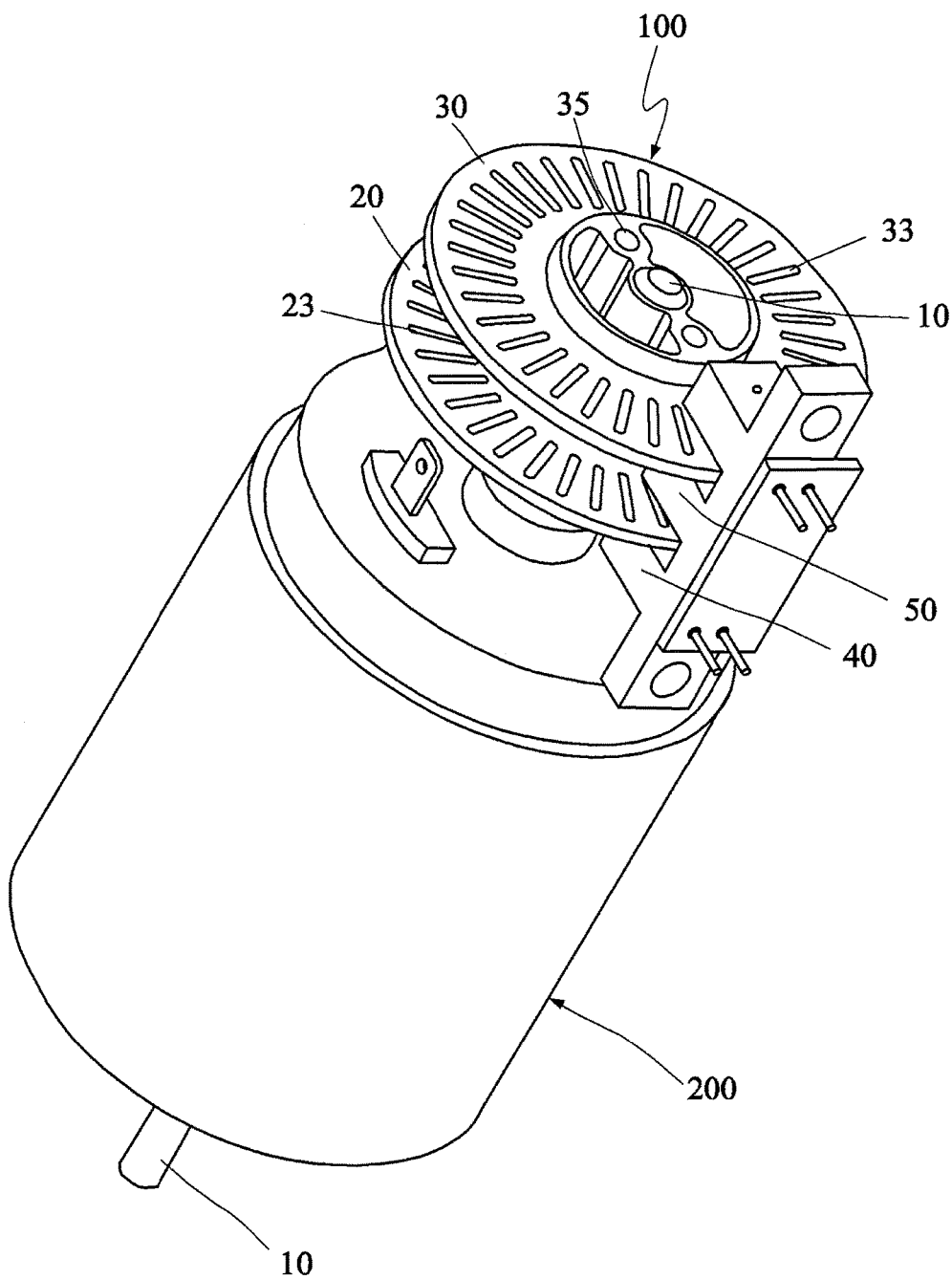
FIG. 1 is a pictorial view showing an application of a rotary encoder according to a first embodiment of this disclosure.
Figure 2:
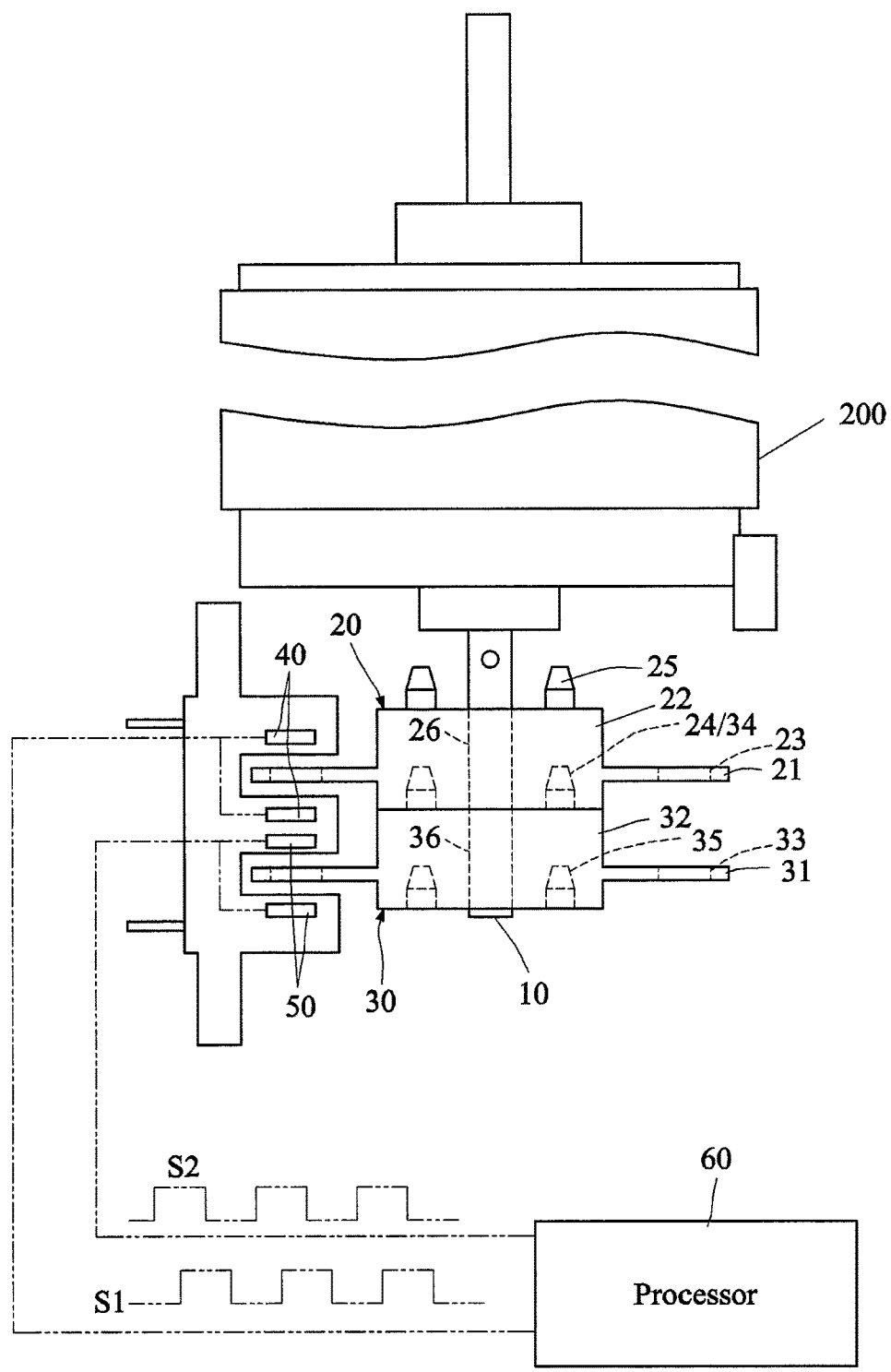
FIG. 2 is a schematic front view showing the application of the rotary encoder of FIG. 1.
Figure 3:
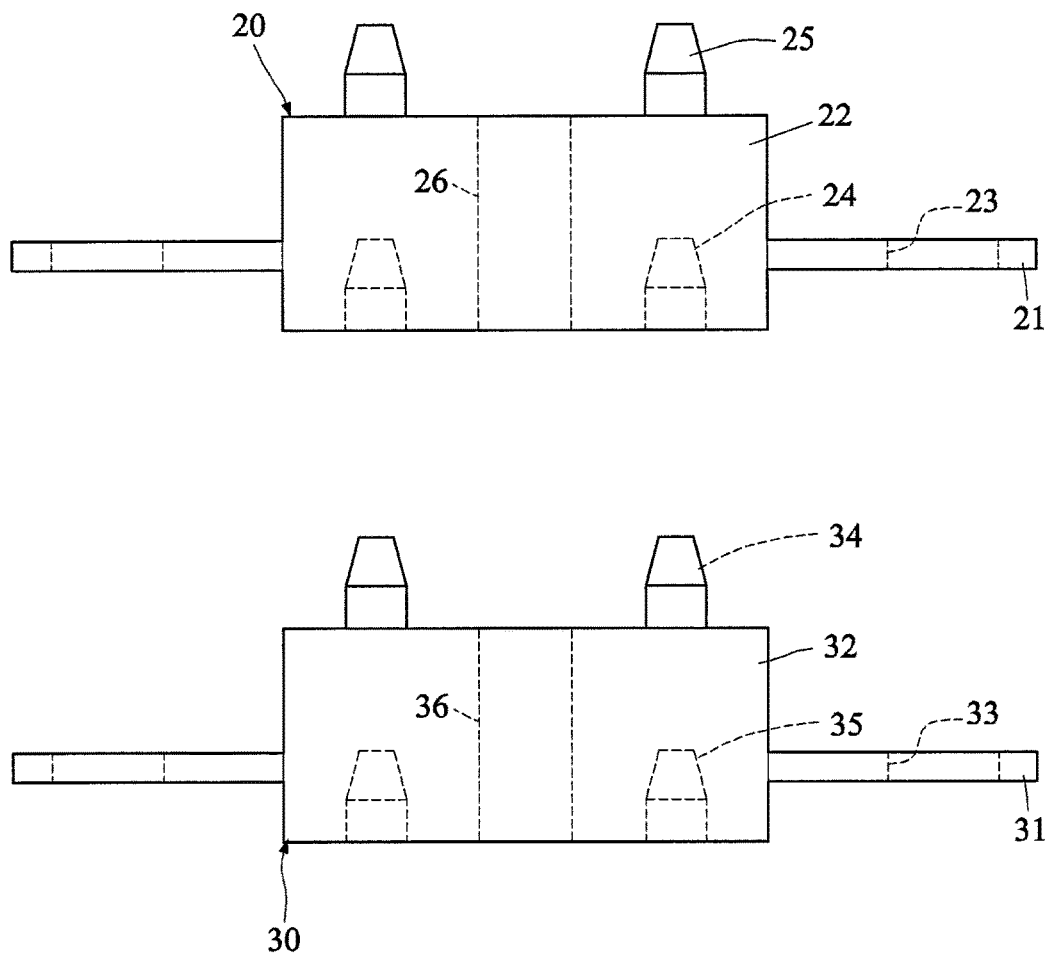
FIG. 3 is a schematic front view showing a first encoder wheel and a second encoder wheel of FIG. 1.

FIG. 1 is a pictorial view showing an application of a rotary encoder 100 according to a first embodiment of this disclosure. FIG. 2 is a schematic front view showing the application of the rotary encoder 100 of FIG. 1. FIG. 3 is a schematic front view showing a first encoder wheel and a second encoder wheel of FIG. 1. As shown in FIGS. 1 to 3, the rotary encoder 100 of this embodiment is applied to a motor 200 to measure a rotating angle of a spindle of the motor 200 to precisely control the rotating angle of the spindle. Such the motor may be applied to a machine, such as a scanner, a printer or the like, needing the precise positioning. The rotary encoder 100 comprises a rotating shaft 10, a first encoder wheel 20, a second encoder wheel 30, a first detector 40, a second detector 50 and a processor 60.

In this embodiment, the rotating shaft 10 and the spindle of the motor 200 are integrally formed, but this disclosure is not restricted thereto. In other embodiments, the rotating shaft 10 may be coaxially connected to the spindle of the motor 200 through a coupler.

The first encoder wheel 20 comprises coaxially disposed first portion 21 and second portion 22. The first portion 21 has first graduation features 23, and the second portion 22 has first positioning structures 24. In this embodiment, the first portion 21 is a disc, the second portion 22 is a combination of a cylinder and a cone, and both the first portion 21 and the second portion 22 are integrally formed jointly with each other by way of, for example, plastic injection molding. The second portion 22 of the first encoder wheel 20 extends to two sides of the first portion 21. The first graduation feature 23 is a slit or slot, and extends along a radial direction of the first encoder wheel 20. That is, the slits or slots are arranged in a radial shape. In other embodiments, the reflective index of the first graduation feature 23 is significantly different from the reflective index of the portion other than the first graduation feature.

The second encoder wheel 30 comprises coaxially disposed third portion 31 and fourth portion 32. The third portion 31 has second graduation features 33, and the fourth portion 32 has second positioning structures 34. In this embodiment, the third portion 31 is a disc, the fourth portion 32 is a cylinder, and both of them are integrally formed jointly with each other by way of, for example, plastic injection molding. The fourth portion 32 of the second encoder wheel 30 extends to two sides of the third portion 31. In this embodiment, the second graduation feature 33 is a slit or slot, and extends along the radial direction of the second encoder wheel 30. In other embodiments, the reflective index of the second graduation feature 33 is significantly different from the reflective index of the portion other than the second graduation feature.

The first detector 40 detects the first graduation features 23 to output a first signal S1. The second detector 50 detects the second graduation features 33 to output a second signal S2. The processor 60 is electrically connected to the first detector 40 and the second detector 50, receives the first signal S1 and the second signal S2, and calculates a rotating angle of the rotating shaft 10 (the rotation angle divided by the time equals to the rotation speed) according to the first signal S1 and the second signal S2. Of course, two phases (A and B phases), between which a phase difference of 90 degrees is present, may also be utilized to determine a rotation direction of the rotating shaft 10. In this embodiment, a transmissive detector is used according to the structure of the slits or slots. In other embodiments, a reflective detector may be used according to the feature relating to the difference between the reflective indexes. In FIG. 2, waveforms of the first signal S1 and the second signal S2 are the same as each other, but a time difference is present therebetween, so that the measurement effect with the doubled resolution can be generated according to this time difference. The processor 60 may also be electrically connected to the motor 200, and controls the rotating angle and the direction of the motor 200 according to the first signal S1 and the second signal S2.

Figure 4:
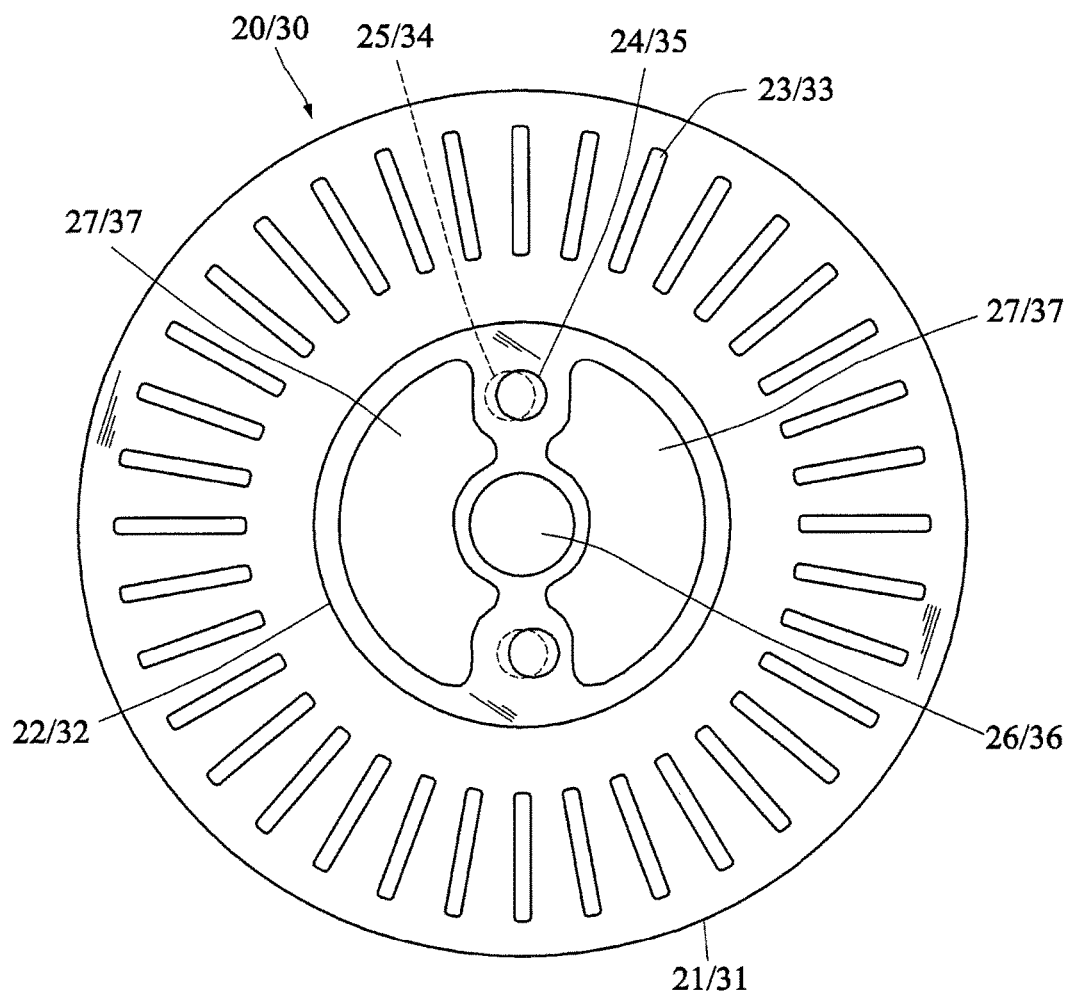
FIG. 4 is a schematic top view showing the first encoder wheel or the second encoder wheel of FIG. 1.
Figure 5:
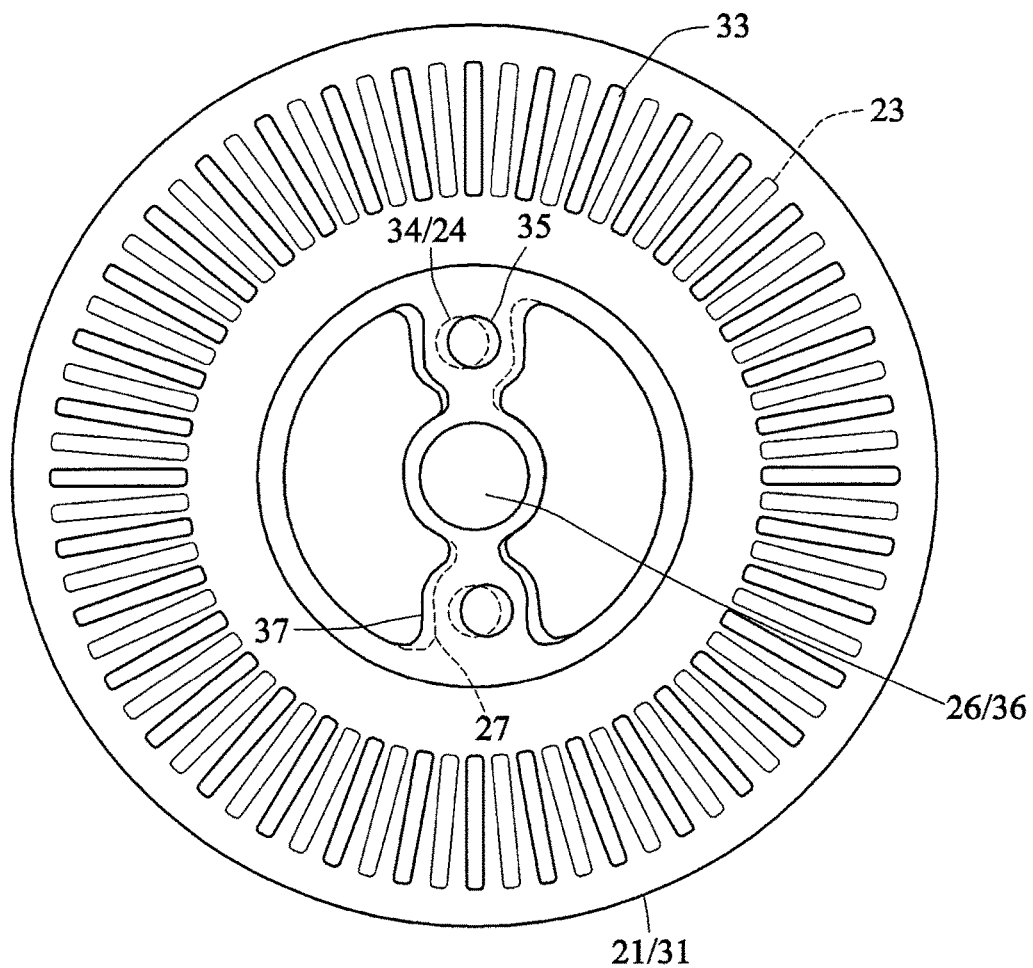
FIG. 5 is a schematic top view showing a combination of the first encoder wheel and the second encoder wheel of FIG. 1.

FIG. 4 is a schematic top view showing the first encoder wheel 20 or the second encoder wheel 30 of FIG. 1. FIG. 5 is a schematic top view showing a combination of the first encoder wheel 20 and the second encoder wheel 30 of FIG. 1. In order to achieve the effect of the doubled resolution, the following structure design, as shown in FIGS. 4 and 5, is adopted in this embodiment. The first positioning structures 24 meshes with the second positioning structures 34, respectively, so that the first graduation features 23 and the second graduation features 33 are staggered. That is, when the first graduation features 23 and the second graduation features 33 are orthogonally projected onto the second portion 22, the first graduation features 23 and the second graduation features 33 are staggered or disposed alternately.

In this embodiment, the first graduation features 23 and the second graduation features 33 are staggered equidistantly to achieve the effect of the doubled resolution. In another embodiment, the first graduation features 23 and the second graduation features 33 are not staggered equidistantly.

The first encoder wheel 20 and the second encoder wheel 30 are coaxially mounted on the rotating shaft 10. In this embodiment, two conical cylinders are provided to serve as two second positioning structures 34, and two openings corresponding to the conical cylinders are provided to serve as two first positioning structures 24. In other embodiments, one single first positioning structure 24 and one single second positioning structure 34 can achieve the effect of this disclosure. That is, the rear portion of the first encoder wheel 20 can be combined with the front portion of the second encoder wheel 30 so that the first graduation features 23 and the second graduation features 33 are staggered, and the effect of this disclosure can be achieved.

In the non-restrictive embodiment, the first encoder wheel 20 and the second encoder wheel 30 have the same structure. With this design, each of the first encoder wheel 20 and the second encoder wheel 30 may be implemented using one single part. Thus, only one set of molds is needed for plastic injection molding, and the encoder wheel may be manufactured in the mass production manner, so that the cost can be decreased, the assembly can be implemented without distinguishing between the two parts, and the assembling problems may be decreased.

In this case, the second portion 22 of the first encoder wheel 20 further has third positioning structures 25. The third positioning structures 25 and the first positioning structures 24 are disposed on two sides of the first portion 21, respectively, and are staggered with an angle formed therebetween and relative to the rotating shaft 10. The fourth portion 32 of the second encoder wheel 30 further has fourth positioning structures 35. The fourth positioning structures 35 and the second positioning structures 34 are respectively disposed on two sides of the third portion 31, and are staggered with an angle formed therebetween and relative to the rotating shaft 10. For example, the first encoder wheel 20 and the first encoder wheel 20 have 36 first graduation features 23 and 36 second graduation features 33, respectively, so that the original minimum angular graduation (10 degrees) is divided into the minimum angular graduation of 5 degrees. Thus, the above-mentioned staggered angle is equal to 5 degrees (360/36/2=5). In addition, the first encoder wheel 20 has a shaft hole 26 and two through holes 27, and the second encoder wheel 30 has a shaft hole 36 and two through holes 37. The shaft holes 26 and 36 are to be fit with the rotating shaft 10, and the through holes 27 and 37 are provided for the purpose of saving the materials and weights.

Figure 6:
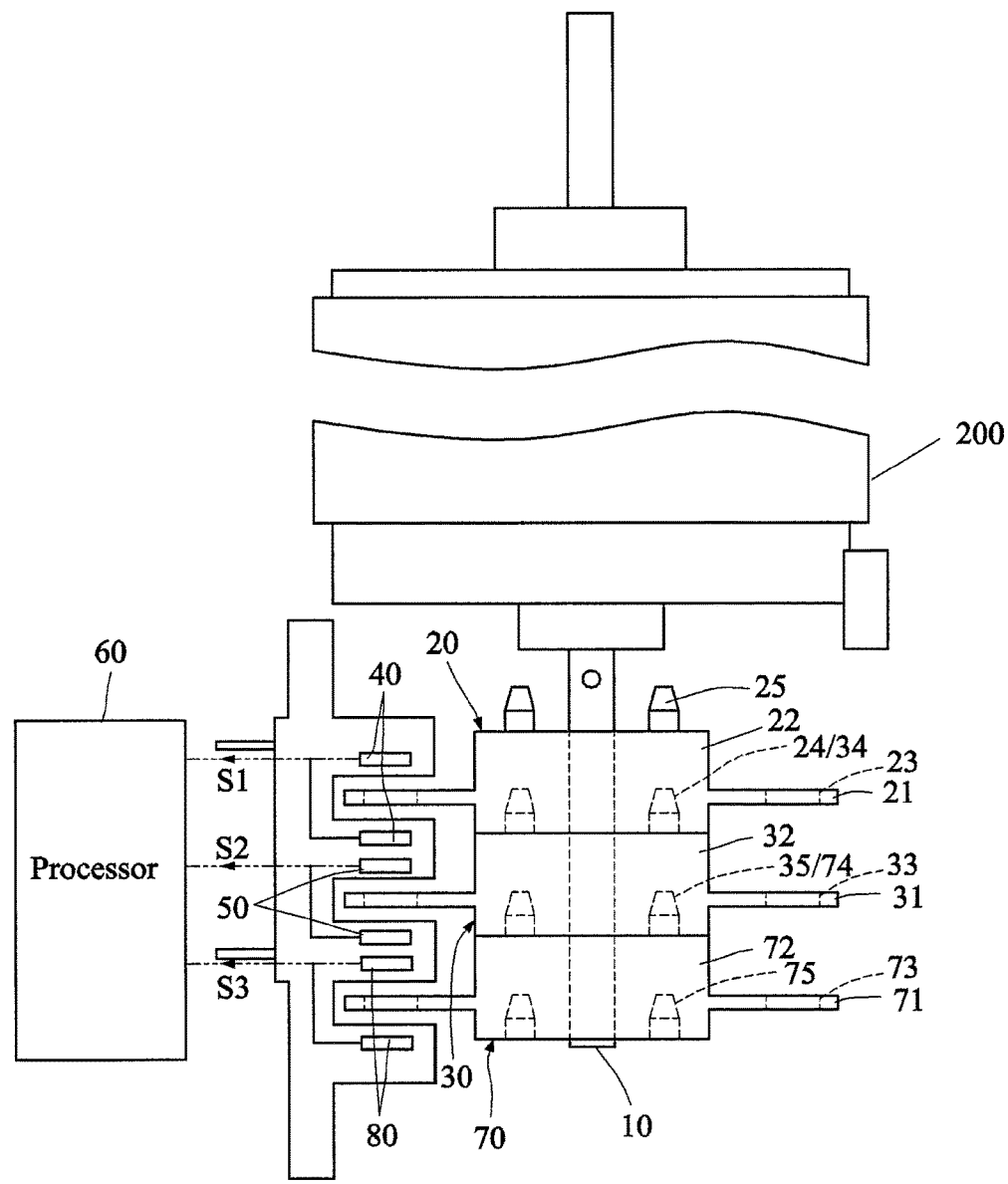
FIG. 6 is a pictorial view showing an application of a rotary encoder according to a second embodiment of this disclosure.

FIG. 6 is a pictorial view showing the application of the rotary encoder 100 according to a second embodiment of this disclosure. As shown in FIG. 6, this embodiment is similar to the first embodiment except for the difference that three encoder wheels are used to triple the resolution. It is worth noting that four or more than four encoder wheels may also be increased to increase the resolution to four times or more than four times. Thus, the poor finished products cannot be obtained when the slits or slots of the single encoder wheel, which need not to be arranged too densely, are manufactured by way of injection molding.

Thus, the rotary encoder 100 of this embodiment further comprises a third encoder wheel 70 and a third detector 80. The third encoder wheel 70 and the second encoder wheel 30 are coaxially mounted on the rotating shaft 10. The third encoder wheel 70 comprises coaxially disposed fifth portion 71 and sixth portion 72. The fifth portion 71 has third graduation features 73, and the sixth portion 72 has fifth positioning structures 74. The fifth positioning structures 74 mesh with the fourth positioning structures 35 of the fourth portion 32 of the second encoder wheel 30, respectively, so that the second graduation features 33 and the third graduation features 73 are staggered. Similarly, the sixth portion 72 of the third encoder wheel 70 also has sixth positioning structures 75 disposed opposite the fifth positioning structures 74. Thus, the first encoder wheel 20, the second encoder wheel 30 and the third encoder wheel 70 have the same structure.

The third detector 80 detects the third graduation features 73 to output a third signal S3. Thus, the processor 60 receives the first signal S1, the second signal S2 and the third signal S3, and calculates the rotating angle of the rotating shaft 10 according to the first signal S1, the second signal S2 and the third signal S3.

Figure 7:
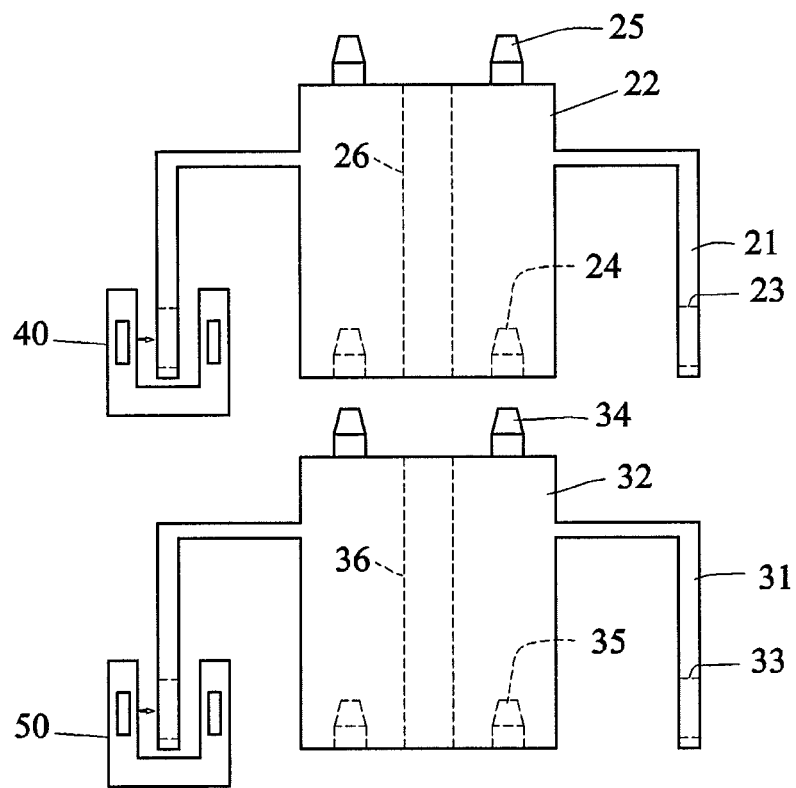
FIG. 7 is a schematic front view showing a first encoder wheel and a second encoder wheel according to a third embodiment of this disclosure.

FIG. 7 is a schematic front view showing the first encoder wheel 20 and the second encoder wheel 30 according to a third embodiment of this disclosure. As shown in FIG. 7, this embodiment is similar to the first embodiment except for the difference that each first graduation feature 23 extends along an axial direction of the first encoder wheel 20, and each second graduation feature 33 extends along an axial direction of the second encoder wheel 30. That is, the first graduation features 23 are disposed on the circumference of the first encoder wheel 20 and are parallel to each other, and the second graduation features 33 are disposed on the circumference of the second encoder wheel 30 and are parallel to each other.

With the above-mentioned embodiment, the staggered encoder wheels may be used to achieve the effect of increasing the resolution, so that the manufacturing cost of the encoder wheel can be decreased, and the production yield can be increased. Because the encoder wheels with the same structure can be adopted to achieve the staggered effect, only one set of molds needs to be used to manufacture the encoder wheels by way of injection molding, so that the manufacturing cost of the rotary encoder can be further decreased, and the assembling processes can be simplified.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A rotary encoder, comprising:
   a rotating shaft;
   a first encoder wheel comprising coaxially disposed a first portion and a second portion, wherein the first portion has first graduation features, and the second portion has a first positioning structure;
   a second encoder wheel comprising coaxially disposed a third portion and a fourth portion, wherein the third portion has second graduation features, the fourth portion has a second positioning structure, and the first positioning structure meshes with the second positioning structure, so that the first graduation features and the second graduation features are staggered, and the first encoder wheel and the second encoder wheel are coaxially mounted on the rotating shaft;
   a first detector detecting the first graduation features to output a first signal;
   a second detector detecting the second graduation features to output a second signal; and
   a processor, which is electrically connected to the first detector and the second detector, receives the first signal and the second signal, and calculates a rotating angle of the rotating shaft according to the first signal and the second signal, wherein the second portion of the first encoder wheel extends to two sides of the first portion.

2. The rotary encoder according to claim 1, wherein the second portion of the first encoder wheel further has a third positioning structure, and the third positioning structure and the first positioning structure are disposed on the two sides of the first portion, respectively, and are staggered with an angle formed between the third positioning structure and the first positioning structure and relative to the rotating shaft.

3. The rotary encoder according to claim 2, wherein the fourth portion of the second encoder wheel further has a fourth positioning structure, and the fourth positioning structure and the second positioning structure are respectively disposed on two sides of the third portion, and are staggered with the angle formed between the fourth positioning structure and the second positioning structure and relative to the rotating shaft.

4. The rotary encoder according to claim 1, wherein the first graduation features and the second graduation features are staggered equidistantly.

5. The rotary encoder according to claim 1, wherein each of the first graduation features extends along an axial direction of the first encoder wheel.

6. The rotary encoder according to claim 1, further comprising:
   a third encoder wheel comprising coaxially disposed a fifth portion and a sixth portion, wherein the fifth portion has third graduation features, the sixth portion has a fifth positioning structure, and the fifth positioning structure meshes with a fourth positioning structure of the fourth portion of the second encoder wheel, so that the second graduation features and the third graduation features are staggered, and the third encoder wheel and the second encoder wheel are coaxially mounted on the rotating shaft; and
   a third detector detecting the third graduation features to output a third signal, wherein
   the processor receives the first signal, the second signal and the third signal, and calculates the rotating angle of the rotating shaft according to the first signal, the second signal and the third signal.

7. The rotary encoder according to claim 6, wherein the first encoder wheel, the second encoder wheel and the third encoder wheel have the same structure.

8. A rotary encoder, comprising:
   a rotating shaft;
   a first encoder wheel comprising coaxially disposed a first portion and a second portion, wherein the first portion has first graduation features, and the second portion has a first positioning structure;
   a second encoder wheel comprising coaxially disposed a third portion and a fourth portion, wherein the third portion has second graduation features, the fourth portion has a second positioning structure, and the first positioning structure meshes with the second positioning structure, so that the first graduation features and the second graduation features are staggered, and the first encoder wheel and the second encoder wheel are coaxially mounted on the rotating shaft;
   a first detector detecting the first graduation features to output a first signal;
   a second detector detecting the second graduation features to output a second signal; and
   a processor, which is electrically connected to the first detector and the second detector, receives the first signal and the second signal, and calculates a rotating angle of the rotating shaft according to the first signal and the second signal, wherein the first encoder wheel and the second encoder wheel have the same structure.

9. A rotary encoder, comprising:
a rotating shaft;
a first encoder wheel comprising coaxially disposed a first portion and a second portion, wherein the first portion has first graduation features, and the second portion has a first positioning structure;
a second encoder wheel comprising coaxially disposed a third portion and a fourth portion, wherein the third portion has second graduation features, the fourth portion has a second positioning structure, and the first positioning structure meshes with the second positioning structure, so that the first graduation features and the second graduation features are staggered, and the first encoder wheel and the second encoder wheel are coaxially mounted on the rotating shaft;
a first detector detecting the first graduation features to output a first signal;
a second detector detecting the second graduation features to output a second signal; and
a processor, which is electrically connected to the first detector and the second detector, receives the first signal and the second signal, and calculates a rotating angle of the rotating shaft according to the first signal and the second signal, wherein each of the first graduation features extends along a radial direction of the first encoder wheel.

* * * * *